May 28, 1946.                    R. T. BELL                    2,400,972
                    MULTISTEELYARD WEIGHING MECHANISM
                        Filed Jan. 3, 1945             3 Sheets-Sheet 1

INVENTOR
RICHARD.THOMAS.BELL
by Fetherstonhaugh & Co.
ATTORNEYS

May 28, 1946.    R. T. BELL    2,400,972
MULTISTEELYARD WEIGHING MECHANISM
Filed Jan. 3, 1945    3 Sheets-Sheet 2

INVENTOR
RICHARD. THOMAS. BELL
BY Featherstonhaugh & Co.
ATTORNEYS

INVENTOR
RICHARD. THOMAS. BELL

By Fetherstonhaugh & Co.
ATTORNEYS

Patented May 28, 1946

2,400,972

UNITED STATES PATENT OFFICE 2,400,972

MULTISTEELYARD WEIGHING MECHANISM

Richard T. Bell, Peterborough, Ontario, Canada

Application January 3, 1945, Serial No. 571,149
In Canada January 6, 1944

4 Claims. (Cl. 265—49)

This invention relates to the manufacture of mixtures of solid, powdery or granular materials and water.

The invention will be described in relation to the mixing of concrete containing cement, sand, aggregate and water, although it is applicable also to other mixtures.

It is evident that if the solid powdery or granular material is moist, the effect of weighing out batches of these materials without making allowance for the moisture content, will be to produce a mixture in which the relative proportions of the constituents are incorrect, the amount of water in any case being greater than would be the case if the solid materials were dry when weighed. In the case of concrete the quality of the final product varies greatly with variations in the proportions of the constituents, and in particular with variations in the proportion of water, and the present invention provides a means of ensuring that the proportions of the constituents of every batch shall be the same provided that the percentage moisture content of the solid materials is known.

Use is made of what is known as multi-steelyard weighing mechanism in which the constituents of a batch are fed one at a time to a suspended weighing vessel a proportion of the weight of which is balanced by the poises of a number of steelyards which are connected together in such a manner that they can be readily disconnected from one another. Thus, in the case of concrete there are four steelyards for sand, aggregate, water and cement respectively, the first three being connected together at their free ends in such a way that they can be disconnected when required. Thus, when the second and third are disconnected the weight of the vessel and its contents is balanced by the poise on the first steelyard only. If the second only is connected to the first then the poises on both the first and second steelyards balance the vessel and its contents, while if the third is also connected to the first and second then all three poises are effective. In use the poises are set to the desired weights of sand, aggregate and water. The second and third steelyards being disconnected from the first, sand is placed in the vessel until equilibrium is reached, the second steelyard is placed in connection with the first and aggregate is added until equilibrium is again reached, and finally, after the third steelyard has been placed in connection with the other two water is added (in a separate compartment of the vessel) until equilibrium is reached. The cement is then weighed in a separate operation using the fourth steelyard.

According to the present invention the poise of one or more of the steelyards is formed or provided with an extension having provision for locating upon it a supplementary weight with its centre of gravity in the vertical line of the fulcrum of the steelyard when the poise is in the zero position.

The supplementary weight chosen to correspond to the previously determined percentage of moisture in the solid constituent, is added to the poise for that constituent, thereby making it necessary to place more of it in the weighing vessel than is apparently necessary, and before weighing the water the supplementary weight is removed.

If there is more than one solid constituent liable to contain water, as in the example referred to above, the poise for each such constituent is provided with an extension for a supplementary weight or weights. It will be apparent that if the supplementary weights are not used the proportion of moist solid constituent weighed out will be less than would be the case if the materials were dry. The supplementary weight balances the weight of the water which is contained in the correct quantities of the solid constituents, with the result that equilibrium is reached when the correct amounts of these constituents are placed in the weighing vessel. Evidently, in order to obtain the correct proportion of water, an amount less than the predetermined amount must be weighed out to allow for the water already contained in the solid constituents. It will be at once seen that the act of removing the supplementary weights before weighing the water, the three steelyards being of course connected together, ensures that equilibrium is attained when the lesser quantity of water is placed in the weighing vessel. Thus, by the use of the supplementary weights as described the correct proportions of the various constituents are determined.

Another feature of the invention consists in the provision of mechanical weight raising and lowering means for shifting the supplementary weights to and from an operative position on the poises.

A hopper weighing machine according to this invention is illustrated in the accompanying drawings, in which—

Figure 2:
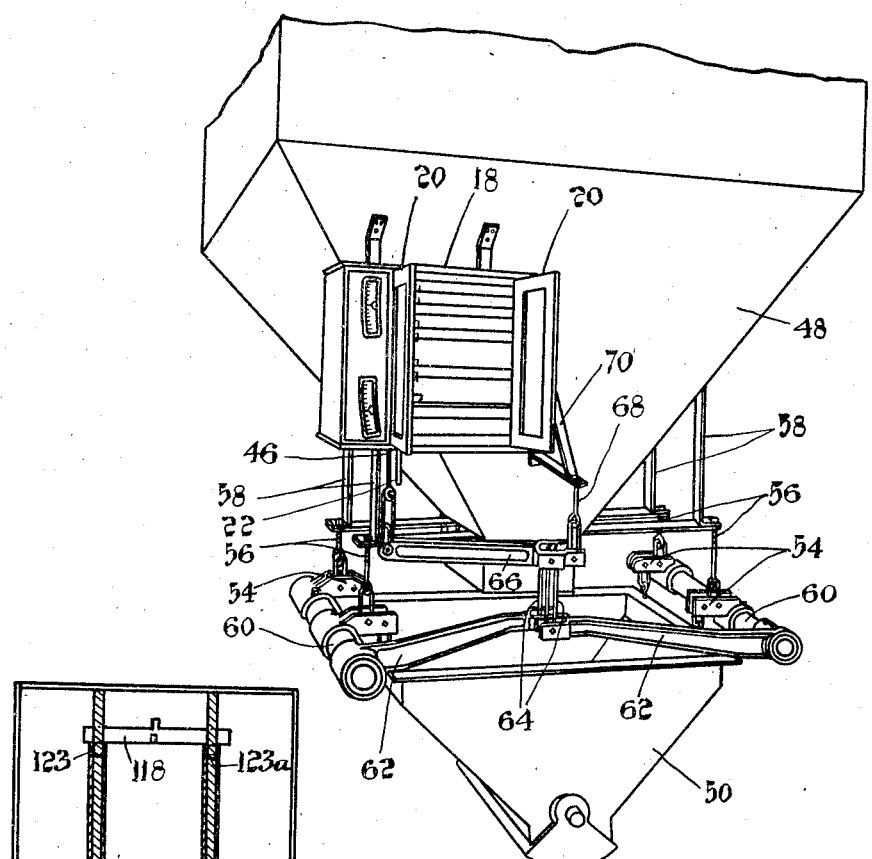
Fig. 2 is a perspective view of the hopper showing the manner in which it is connected to the steelyards.
Figure 5:
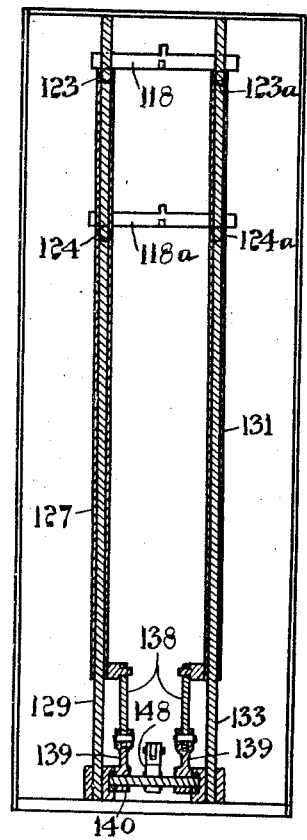
Fig. 5 is a sectional view taken substantially along the section line 5—5 of Fig. 3.

The four steelyards 10, 12, 14 and 16 are mounted one above another in a casing 18 provided with doors 20, Figure 2. The upper steelyard 10 is for weighing sand, the next one 12 for weighing aggregate, the third, 14, for weighing water and the fourth, 16, for weighing cement. The steelyards 10, 12 and 14 cooperate with one another because, as previously described, the weight of water is automatically varied in accordance with the percentage of moisture in the sand or in the aggregate or both. The cement, however, is assumed to have no moisture content and the steelyard 16 is therefore entirely independent of the other three. The weight of the cement in a separate hopper (not shown) is transferred to this steelyard through the pull-rod 22 and is balanced by a movable poise 24. The free end of the steelyard is connected by a link 26 to the piston of a dashpot 28 and is connected through a knife edge 30 to a pointer arm 32, the fulcrum point 34 of which is connected to a fixed point 36 by a link 38. The pointer 40 at the left-hand end of the arm 32 reads against a scale 42 having a centre zero mark 44.

The weight of the sand, aggregate and water is transferred to the upper steelyard 10 through a pull-rod 46. The manner in which this is done is illustrated in Figure 2. The materials are supplied through an upper hopper 48 to the weighing hopper 50 which is fitted with a pivoted closure 52. The hopper 50 is suspended from the inner ends of arms 54 suspended by links 56 from brackets 58 fixed to the hopper 48. At their outer ends the arms 54 are secured to shafts 60 each of which carries an arm 62, the two arms 62 having their ends connected by links 64 to a lever 66. This lever 66 is suspended at one end by a link 68 from a bracket 70 and at its other end it is connected to the pull-rod 46. The arrangement illustrated in Figure 2 is already known and in itself forms no part of the present invention.

Figure 1:
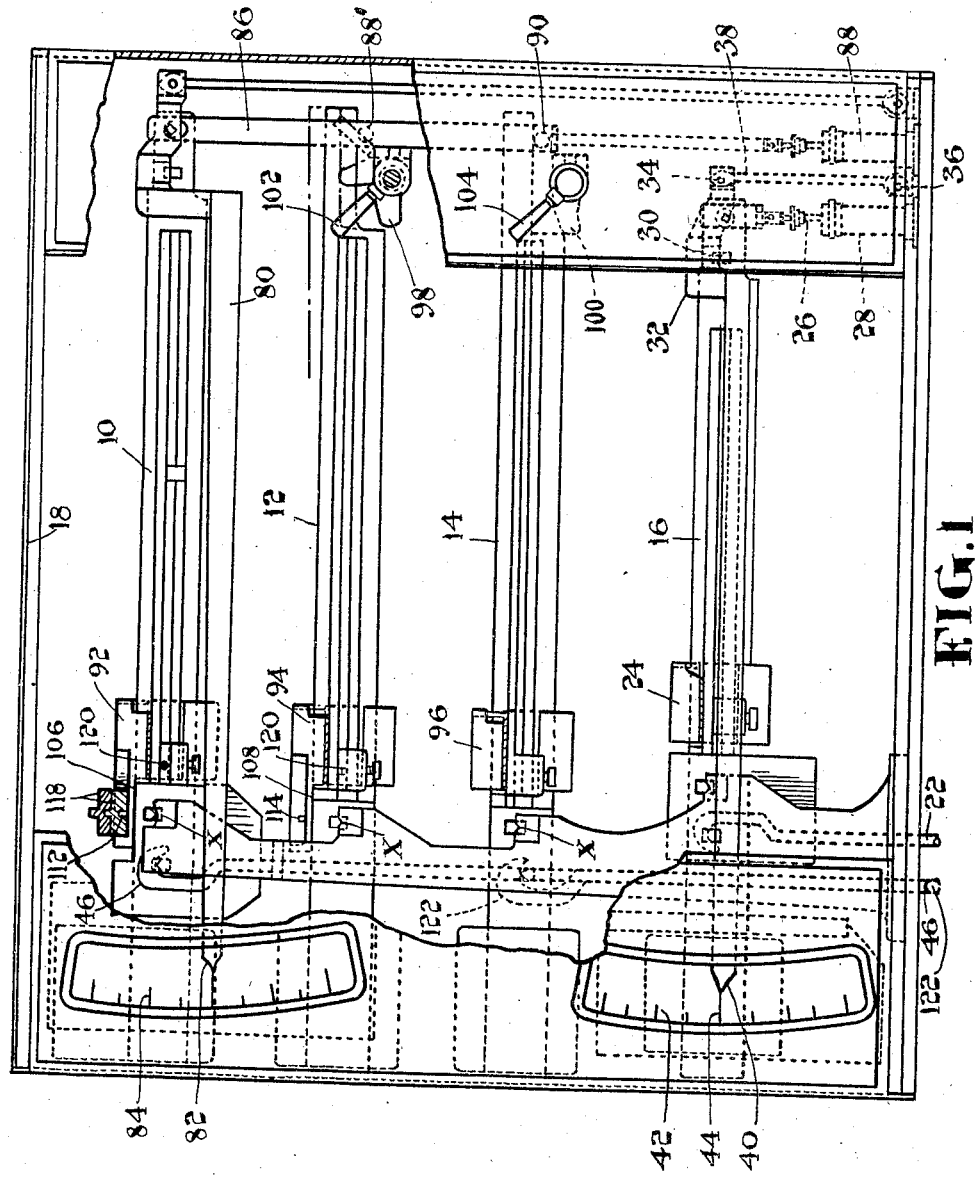
Fig. 1 is a front elevation of the steelyards, parts of the casing being broken away to show the mechanism.

Referring again to Figure 1, the steelyard 10 has a pointer arm 80 connected to it in the manner already described in connection with the pointer arm 32 and the corresponding pointer 82 reads against a scale 84 similar to the scale 42. This steelyard is also connected at its free end by a link 86 to a dashpot 88. This link 86 carries two pins 88" and 90. Normally the free end of the steelyard 12 rests upon the pin 88 and the free end of the steelyard 14 rests upon the pin 90. Thus, the weight of the hopper 50 and its contents is transferred to all three steelyards 10, 12 and 14 and is balanced by the three poises 92, 94 and 96. The steelyards 12 and 14, however, can be lifted out of contact with the pins 88, 90 respectively by means of pivoted cams 98, 100 provided with actuating handles 102, 104 respectively, external to the casing. When both these handles are moved to the right the weight of the hopper 50 and its contents is balanced solely by the poise 92.

Each of the poises 92, 94 is provided with an extension 106, 108 respectively which carries a peg 112, 114 respectively, this peg being in each case vertically above the knife edge pivot X of the steelyard when the poise is in the zero position—this is to say, the position at which the poise balances the weight of the empty hopper. A series of weights 118 is provided each of which has a central hole by which it can be located by the peg 112 or 114 upon the extension of the main poise. These weights 118, only two of which are shown, are marked with numbers representing percentages of moisture. In order to provide conveniently for fractional percentages an additional peg 120 is provided upon each of the poises 92, 94 to accommodate smaller percentage weights.

The operation of the device will now be clear from the description previously given. The percentage of moisture in the sand and the aggregate having previously been determined, the appropriate percentage weights are placed over the pegs 112, 114 and both handles 102, 104 are turned to the right. Sand is now fed into the hopper 50 until the pointer 82 reads zero. The handle 102 is then turned to the left thereby causing the free end of the steelyard to press down upon the pin 88. Aggregate is now fed into the hopper 50 until the pointer 82 again reads zero. The handle 104 is now turned to the left to cause the free end of the steelyard 14 to press down upon the pin 90, the percentage weights upon the pegs 112, 114 are removed and water is introduced into the hopper 50 until the pointer 82 once more reads zero. As previously explained, the sand and aggregate introduced into the hopper 50 actually contain the correct predetermined weights of the dry materials together with a certain amount of water. The weight of this water is balanced by the percentage weights but when these are removed the balance is disturbed and it follows that the amount of water actually weighed out is equal to the correct predetermined weight minus the weight already introduced with the sand and aggregate.

In actual practice the water is placed in a separate compartment of the hopper 50 as it is not desired to wet the sand and aggregate while they are in the hopper.

In some cases it is convenient to weigh the water in an entirely separate vessel. In this case the water vessel is connected by a linkage similar to that shown in Figure 2 to a separate pull-rod 122 indicated in dotted lines in Figure 1 to the steelyard 14. The weighing mechanism operates in exactly the same way as it does when the weight of the water is transmitted to the steelyard 10 and the sequence of operations is not varied in any way.

In a scale of the type described herein the steelyards or beams are usually graduated up to about 7500 lbs. It is therefore necessary that the supplementary weights be exactly centered in their operative positions which, of course, necessitates very close tolerances on the pins on which these weights are set. This close fitting of the weights on their positioning pins gives rise to considerable delay when the weights are lifted off the pins by hand since, with hand lifting, it is difficult to avoid a slight tilting of the weights which is sufficient to cause them to bind on the pins. As the output of the weighing mechanism is based on the production of one three cubic yard batch of concrete ingredients every 45 seconds, it will be seen that delay in lifting the supplementary weights (prior to the weighing of the water) cuts down production. This difficulty is overcome by the weight lifting and lowering mechanism shown in Figures 3 to 6 inclusive.

In describing the arrangement shown in the last mentioned figures, it may be explained that the supplementary weights 118 and 118a are dimensioned so that their ends project laterally beyond the poises 92 and 94 on which they are positioned. The projecting ends of weight 118 overlie a pair of vertically movable lifting bars 123 and 123a by means of which the weight is raised and lowered with a perfectly vertical motion. The projecting ends of weight 118a overlie and are similarly raised and lowered by a second pair of vertically movable lifting bars 124 and 124a.

The bars 123 and 124 extend between and are carried by sleeves 126 and 127 which are slidable vertically on guide posts 128 and 129. The bars 123a and 124a are similarly carried by sleeves 130 and 131 which slide on vertical guide posts 132 and 133.

The lower ends of sleeves 126 and 130 are connected by links 135 to the crank arms 136 of a rotatably mounted shaft 137. The lower ends of sleeves 127 and 131 are similarly connected by links 138 to the crank arms 139 of a rotatably mounted shaft 140.

An operating shaft 142, equipped with a handle 143, is arranged between and parallel with shafts 137 and 140. A crank arm 144 of shaft 142 is connected, by links 145 and 146, to the crank arms 147 and 148 of shafts 137 and 140.

Figure 6:
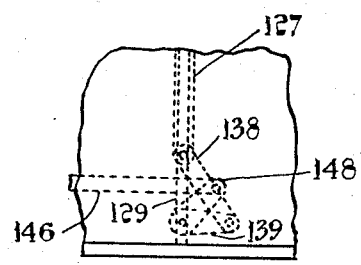
Fig. 6 is a detail view of a portion of the mechanical weight raising and lowering means.
Figure 3:
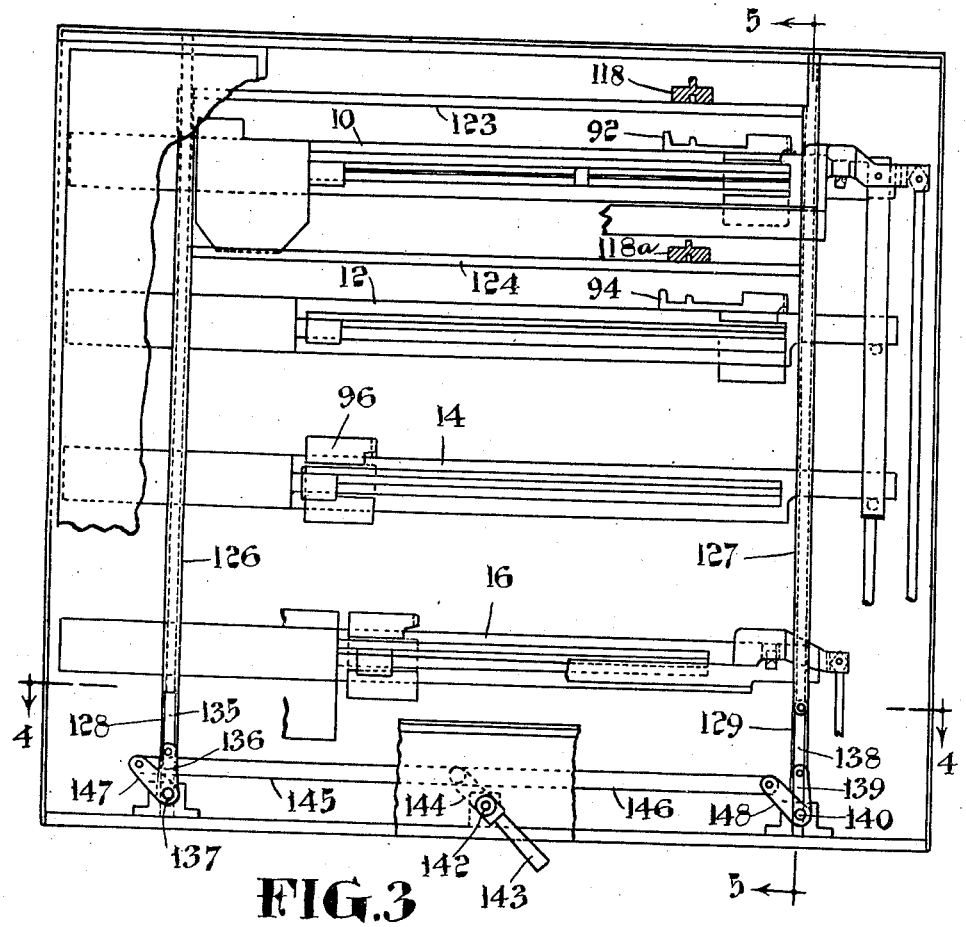
Fig. 3 is a view similar to Fig. 1 but showing a modified arrangement including mechanical means for shifting the supplementary weights to and from an operative position on the poises.
Figure 4:
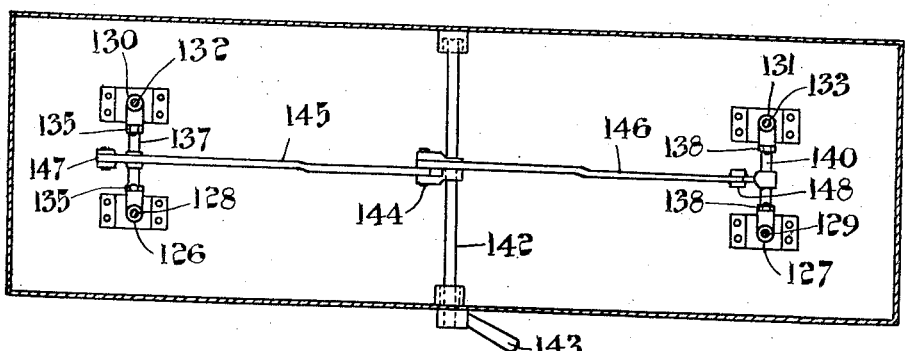
Fig. 4 is a sectional view taken substantially along the section line 4—4 of Fig. 3.

The procedure followed in using the modified arrangements disclosed in Figures 3 to 6 inclusive may be described as follows:

Having ascertained the percentage of moisture content in the ingredients, the percentage weights 118 and 118a are placed upon the poises 92 and 94 which have previously been set to the correct weight of the dry material required, the lifting rods and tubes of the weight raising and lowering mechanism being at this time in their lowermost positions, as indicated, for example, in Figure 6. The load required on steelyard No. 10 is then placed in the hopper until this steelyard is in equilibrium. Steelyard 12 is then thrown into action as, for example, by the cam mechanism shown in Figure 1 and the hopper filled until steelyard 12 is in equilibrium. The operator then turns handle 43 so that the tubes and lifting bars of the weight raising and lowering mechanism are moved vertically to lift the supplementary weights 118 and 118a from the poises 92 and 94. The water-controlling steelyard 14, upon which the poise 96 has previously been set to the correct amount of water, is thrown out of balance to the extent of the water already weighed in with the material on the steelyards 10 and 12. Water is then dumped into the hopper until steelyard 14 is in equilibrium and the correct proportions of stone, sand and water are arrived at. For the ensuing batch the handle 143 is moved to lower the tubes and lifting bars of the weight raising and lowering mechanism so that the supplementary weights 118 and 118a are dropped back onto the poises 92 and 94.

It will be noted that the lifting bars of the weight raising and lowering mechanism enable the supplementary weights 118 and 118a to be raised and lowered at any position to which these weights are adjusted along the length of the graduations on the associated steelyards.

The component parts of the weight raising and lowering mechanism are designed so that the supplementary weights 118 and 118a are raised and lowered with a true vertical motion which prevents any binding of the weights on their positioning pins as they are removed from or replaced on said pins.

Having thus described my invention, what I claim is:

1. Multi-steelyard weighing mechanism in which the poises of one or more of the steelyards is formed or provided with an extension having provision for locating upon it a supplementary weight with the centre of gravity in the vertical line of the fulcrum of the steelyard when the poise is in the zero position and mechanical weight raising and lowering means for shifting the supplementary weight to and from an operative position on the associated poise.

2. Multi-steelyard weighing mechanism according to claim 1 wherein the extension consists of a small platform extending above the fulcrum of the steelyard and provided with an upstanding peg for locating upon it a weight having a central peg-receiving hole and wherein said weight raising and lowering means functions to raise and lower the weight with a true vertical motion which prevents binding of the weight on said peg.

3. Multi-steelyard weighing mechanism according to claim 1 wherein the poise and the supplementary weight associated therewith are dimensioned so that the ends of the weight project laterally beyond opposite sides of the poise and wherein said weight raising and lowering means comprises a pair of vertically movable lifting bars underlying the projecting ends of said weight.

4. Multi-steelyard weighing mechanism including a supplementary weight adapted to be arranged on a poise of one of the steelyards, said supplementary weight and poise being dimensioned so that the ends of the weight project laterally beyond opposite sides of the poise, a weight positioning peg extending upwardly from said poise and adapted to be received in a hole provided in said weight, a pair of horizontally extending lifting bars underlying the projecting ends of said weight and means for raising and lowering said bars so that, during the raising movements of the bars, the weight is picked up thereby and raised clear of the peg, while during the lowering movements of the bars, the weight is dropped back on the weight positioning peg of the poise.

RICHARD T. BELL.